United States Patent [19]
Ishikawa et al.

[11] Patent Number: 5,447,827
[45] Date of Patent: Sep. 5, 1995

[54] PHOTOGRAPHIC PROCESSING METHOD

[75] Inventors: Masazumi Ishikawa; Toru Tanibata, both of Wakayama, Japan

[73] Assignee: Noritsu Koki Co., Ltd., Wakayama, Japan

[21] Appl. No.: 198,302

[22] Filed: Feb. 18, 1994

[30] Foreign Application Priority Data

Feb. 24, 1993 [JP] Japan ............... 5-035342

[51] Int. Cl.$^6$ ............................................. G03C 11/02
[52] U.S. Cl. ....................... 430/434; 430/501; 354/120; 355/54; 355/112; 206/455; 206/459.5; 206/578; 206/232
[58] Field of Search ............. 430/401, 434, 501; 354/120; 355/54, 112; 206/449, 455, 456, 459.5, 459.1, 578, 232

[56] References Cited

U.S. PATENT DOCUMENTS

| | | | |
|---|---|---|---|
| 3,947,109 | 3/1976 | Kinder et al. | 355/112 |
| 5,051,773 | 9/1991 | Davis | 355/40 |
| 5,162,842 | 11/1992 | Shiota | 355/54 |
| 5,184,227 | 2/1993 | Foley | 354/120 |
| 5,251,745 | 10/1993 | Repp et al. | 206/455 |
| 5,251,746 | 10/1993 | Gresh et al. | 206/455 |
| 5,314,066 | 5/1994 | Gresh | 206/455 |

FOREIGN PATENT DOCUMENTS

| | | |
|---|---|---|
| 0161731 | 11/1985 | European Pat. Off. . |
| 57-6836 | 1/1982 | Japan . |
| 5-011353 | 1/1993 | Japan . |

*Primary Examiner*—Charles L. Bowers, Jr.
*Assistant Examiner*—Mark F. Huff
*Attorney, Agent, or Firm*—Armstrong, Westerman, Hattori, McLeland and Naughton

[57] ABSTRACT

A photographic processing method for developing a film having been photographed, printing the developed film on a photographic paper and developing the photographic paper, the film being accommodated in a cartridge and set in a predetermined position of a photographic processing apparatus. The method includes the steps of: (a) providing the film or the cartridge with an ID number for identifying the film; (b) making an index print in which respective images of a plurality of frames of the film are arranged in numeral order of the film; and (c) providing the index print with the ID number read from the film or the cartridge. With this method, one is able to find out in which film and in which frame of the film an image desired to be copy-printed is present.

5 Claims, 6 Drawing Sheets

PHOTOGRAPHIC PROCESSING METHOD

BACKGROUND OF THE INVENTION

The present invention relates to photographic processing methods. More particularly, it relates to a photographic processing method by which one is able to easily find in which film and in which frame of the film an image desired to be copy-printed is present.

Conventionally, a developed film is divided into some pieces and stored in a film sheet. Users can know contents of the film stored in the film sheet by checking prints, to which the film is printed, one by one, or by holding the film directly to the light.

However, light intensity (or brightness) and hue of the developed film is reverse of those of the printed photographic paper so that users cannot easily know images of negatives, especially for colour photograph. When users wish to make additional prints, therefore, it takes much time for them to know the specific image and is difficult to distinguish the specific image among the other images if images similar to the specific image exist in the film. Consequently, wrong film numbers might be selected for additional prints.

Further, in case that a developed film is stored in a film sheet, a problem arises that not only time and labor are needed to cut the film into pieces but also the operations for copy-printing the film are rendered troublesome since the film is divided into some pieces. In addition, a film being stored in the film sheet is likely to be folded. Still further, a used cartridge must be disposed of.

In view of the foregoing circumstances, it is an object of the present invention to provide a photographic processing method by which one is able to easily specify in which film and in which frame of the film an image to be copy-printed is present.

It is another object of the present invention to provide a photographic processing method capable of reducing time and labor needed for copy-printing while preventing a stored film from being folded.

SUMMARY OF THE INVENTION

According to one aspect of the present invention, there is provided a photographic processing method for developing a film having been photographed, printing the developed film on a photographic paper and developing the photographic paper, the film being accommodated in a cartridge and set in a predetermined position of a photographic processing apparatus, the method comprising the steps of:

(a) providing in advance the film or the cartridge with an ID number for identifying the film;

(b) making an index print in which respective images of a plurality of frames of the film are arranged in numeral order of the film; and (c) providing the index print with the ID number read from the film or the cartridge.

According to another aspect of the present invention, there is provided a photographic processing method for developing a film having been photographed, printing the developed film on a photographic paper and developing the photographic paper, the film being accommodated in a cartridge and set in a predetermined position of a processing photographic apparatus, the method comprising the steps of:

(a) winding the developed film into a cartridge;

(b) making an index print in which respective images of a plurality of frames of the film are arranged in numeral order of the film; and (c) providing the cartridge and the index print with a same ID number.

According to yet another aspect of the present invention, there is provided a photographic processing method for developing a film having been photographed, printing the developed film on a photographic paper and developing the photographic paper, the film being accommodated in a cartridge and set in a predetermined position of a photographic processing apparatus, the method comprising the steps of:

(a) cutting the developed film into some pieces and placing the pieces of the film into a film sheet;

(b) making an index print in which respective images of a plurality of frames of the film are arranged in numeral number order of the film; and (c) providing the film sheet and the index print with a same ID number.

In the photographic processing method of the present invention, an index print and its corresponding film sheet or its corresponding cartridge into which a film is wound are provided with a same ID number. Hence, an image desired to be copy-printed can be specified easily without any mistake.

DETAILED DESCRIPTION

A photographic processing method according to the present invention will now be described in detail with reference to the attached drawings.

Figure 1:
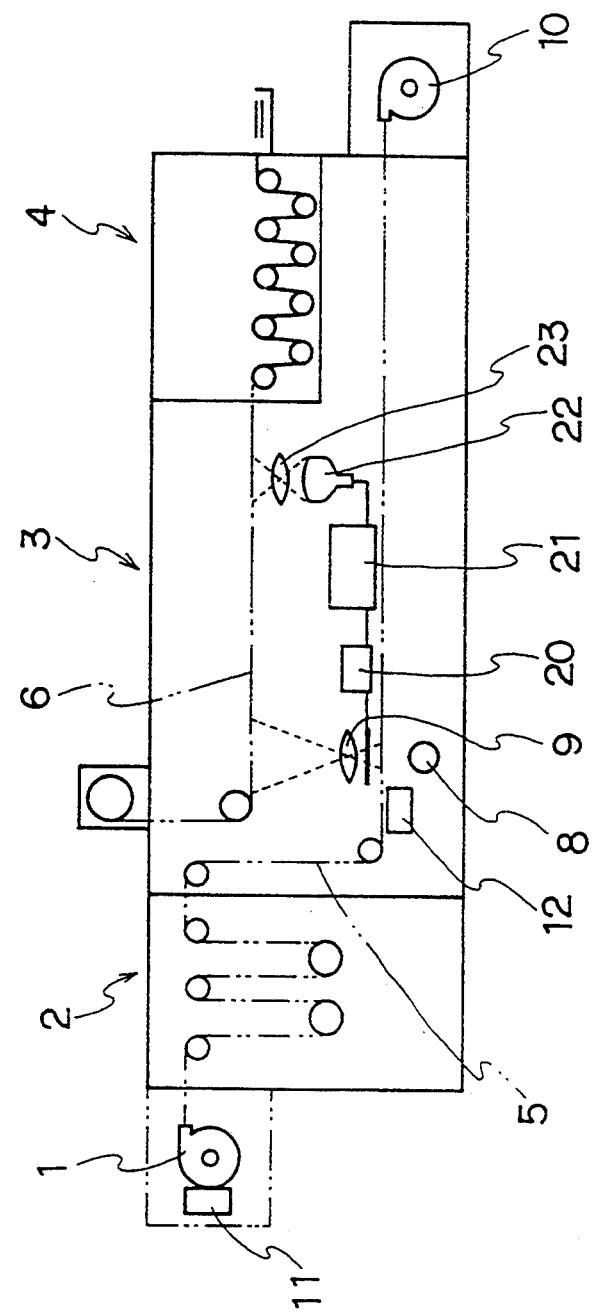
FIG. 1 is a schematic explanatory view of a photographic processing method according to the present invention.

Referring to FIG. 1, denoted by numeral 2 is a film developing part, by numeral 3 a printing part, and by numeral 4 a photographic paper developing part, each of which can employ a conventionally used arrangement.

Figure 3:
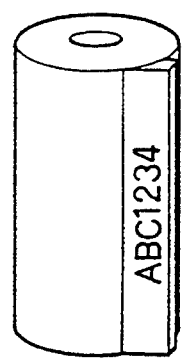
FIG. 3 is an explanatory view of an example of a cartridge for use in the present invention.

First, a film 5 having been photographed and accommodated in a cartridge 1 is set in a predetermined position of a photographic processing apparatus. As shown in FIG. 3, the cartridge 1 is in advance provided with an ID number for identifying the film wound thereinto. The ID number is read by a symbol reader 11. It is noted that the term "ID number" is of a broad concept including alphabetic characters and symbols such as star as well as numerals. The number of such numerals, symbols, characters or the like is not particularly limited herein.

The film 5 drawn out of the cartridge 1 is subjected to film development, printing and photographic paper development according to a common procedure. In FIG. 1, the photographic processing apparatus also includes a light source 8, a lens 9, and a photographic paper 6. A symbol reader 12 which is similar to the symbol reader 11 is adapted to read the ID number given to the film. Therefore, the symbol reader 12 for reading the ID number of a film might be omitted in such an arrangement that an ID number to be read is given to the cartridge 1. The photographic paper 6 which has been developed after printing is cut off by an appropriate cutting means and then ejected from the apparatus. On the other hand, the film 5 thus printed is wound into the cartridge 10. The cartridge 10 is preferably the one which has been previously set in position and from which the film has been drawn. Nevertheless, it might be another cartridge.

Figure 2:
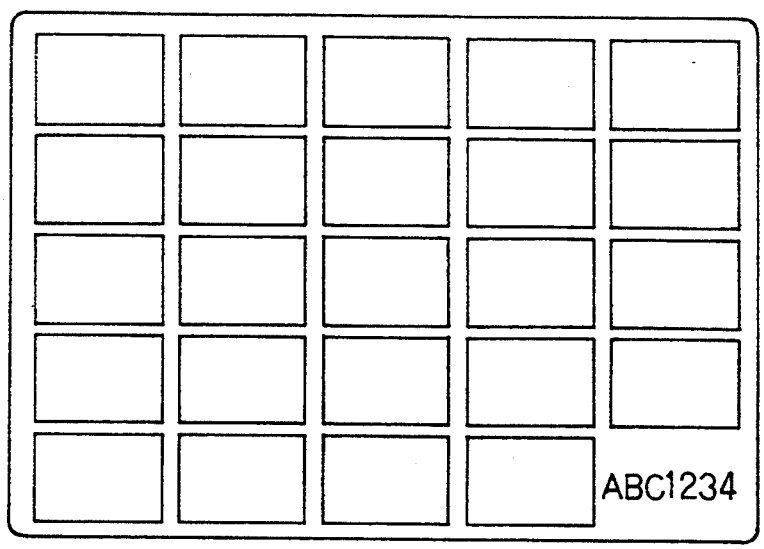
FIG. 2 is an explanatory view of an example of an index print in the present invention.

An index print is made in the following manner. When images of the film 5 are exposed to light of the light source 8 through the lens 9 to be printed on a photographic paper 6 in the printing part 3, images of each frame of the film 5 are read by a film scanner 20 and the data is transmitted to a control part 21. The data of each frame are converted into data for index print at the control part 21 and then printed on the photographic paper 6 through a lens 23 by means of a cathode ray tube (CRT) 22. On the resulting index print is printed the ID number on the basis of the information transmitted from the symbol reader 11 or 12 (refer to FIG. 2). The ID number might be printed on an adhesive sheet to form a label or sticker (hereinafter referred to as "label") to be attached to the index print.

It should be understood that the index print might be in the form of a thermal dye sublimation transfer print obtained by scanning images of the film or ink jet print, as well as a photographic print.

Further, the index print might represent all the frames of a roll of film or several frames thereof. In the case of the latter, a plurality of index prints are needed for one roll of film.

Thus, the cartridge accommodating the developed film and the index print are provided with the same ID number. Hence, one can specify a desired image of the film with ease by referencing the ID number and can find out at first sight without any mistake in which frame of the film the desired image is present.

Figure 8:
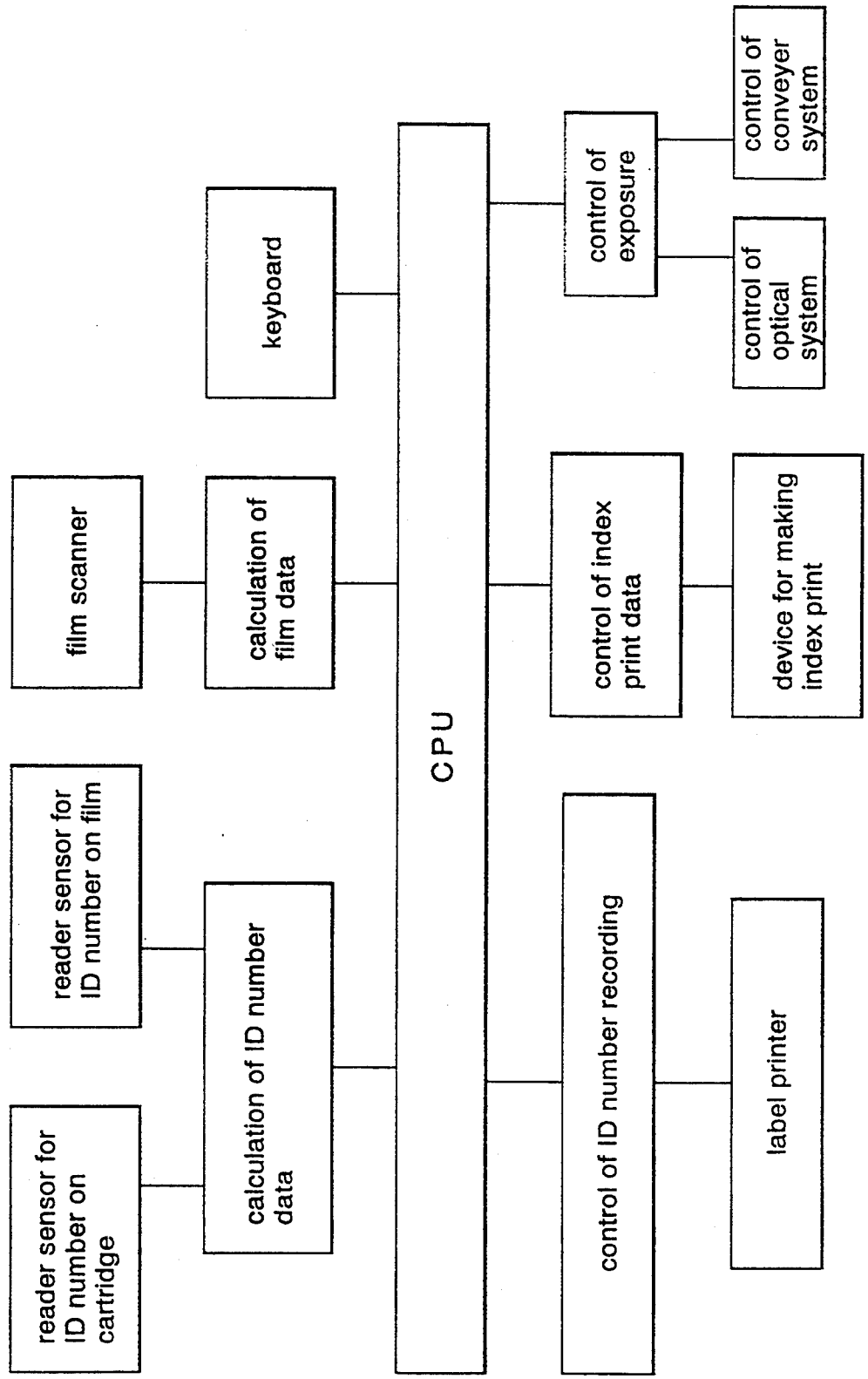
FIG. 8 is a control block diagram of a photographic processing method according to the present invention.
Figure 9:
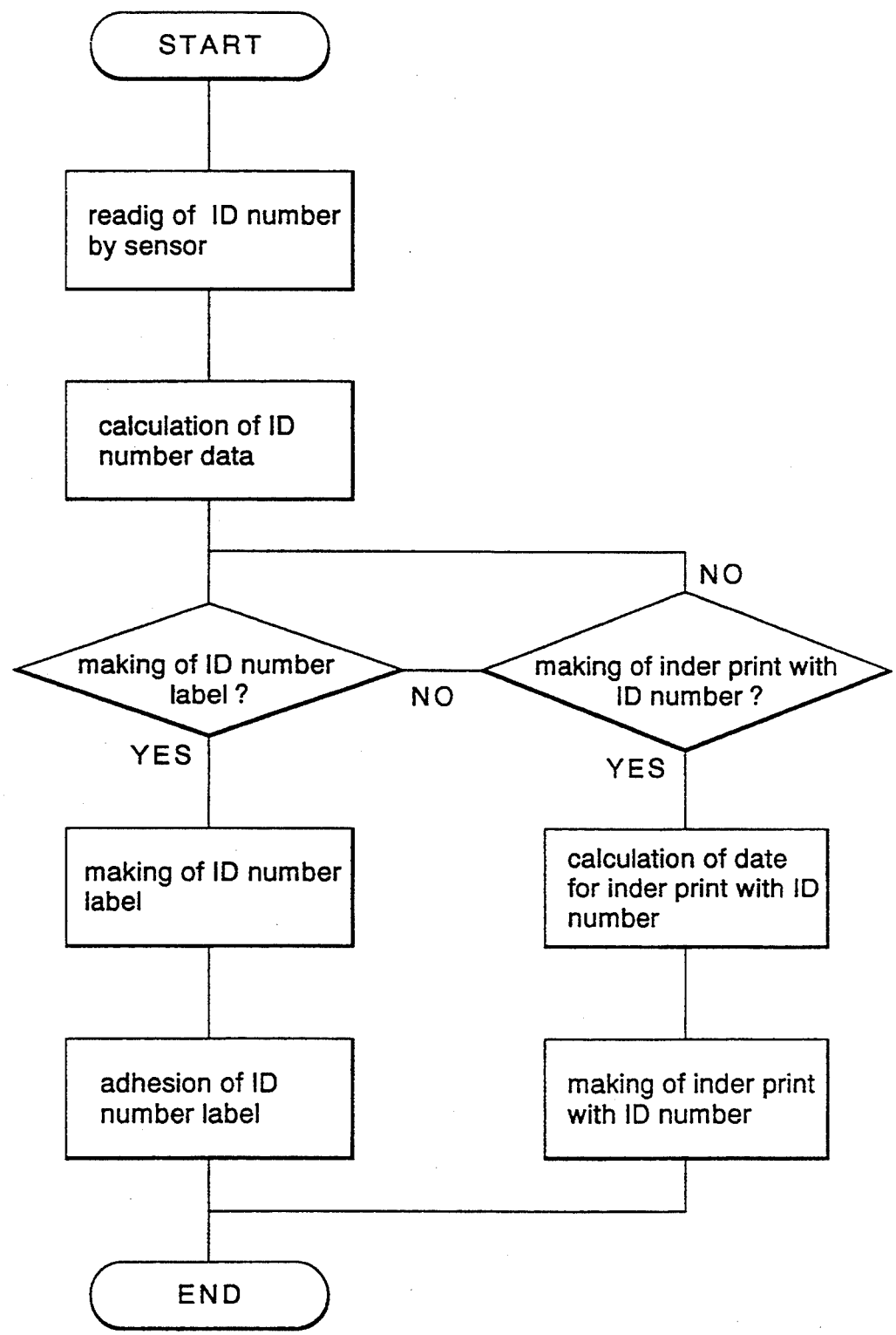
FIG. 9 is a control flow chart of a photographic processing method according to the present invention.

FIGS. 8 and 9 are respectively a block diagram and a flow chart for controlling the aforementioned photographic processing method.

As shown in FIG. 8, the ID number shown on the cartridge or film is read by a reader sensor, then ID number data is calculated from the ID number at CPU. On the other hand, film data of all the frames of the film having been developed is read by a film scanner, then image data is calculated from the film date at CPU. A keyboard allows an entry of character information such as the date or location of photographing and the content of an event photographed. Such character information might be shown on the index print. While a label indicating the ID number is made by a label printer, the index print is made. In order to achieve exposure, there are controlled the optical system components such as a light regulating filter and a shutter and the conveyer system such as a roller for conveying the film or photographic paper.

FIG. 9 shows a process of making a label indicating the ID number read by the sensor and attaching it onto the index print or of printing the ID number directly onto the index print by exposure or using a printer.

Figure 4:
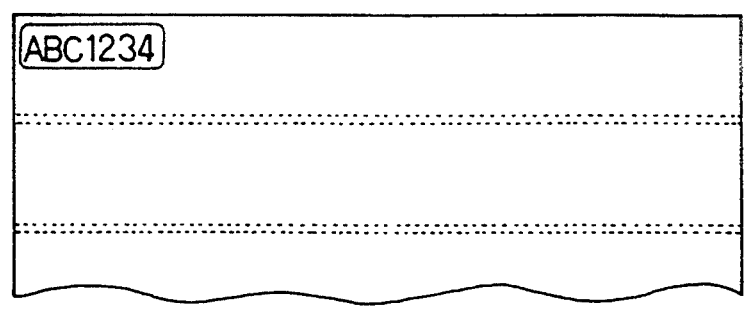
FIG. 4 is an explanatory view of an example of a film sheet for use in the present invention.

After printing is completed, the film might be stored in a film sheet conventionally used (to which is given the ID number by attaching thereto a label on which the ID number is printed or by printing the ID number thereon) instead of being wound into a cartridge, as shown in FIG. 4. Nevertheless, the latter, or winding the film into a cartridge, will be advantageous over the former in that:

(1) a film sheet, which is expendable, can be dispensed with;
(2) a cartridge can be utilized again as it is;
(3) a film cutter can be dispensed with:
(4) time and labor can be lessened for copy-printing since a film is not cut into pieces;
(5) a film will never be folded during storage; and the like.

Figure 5:
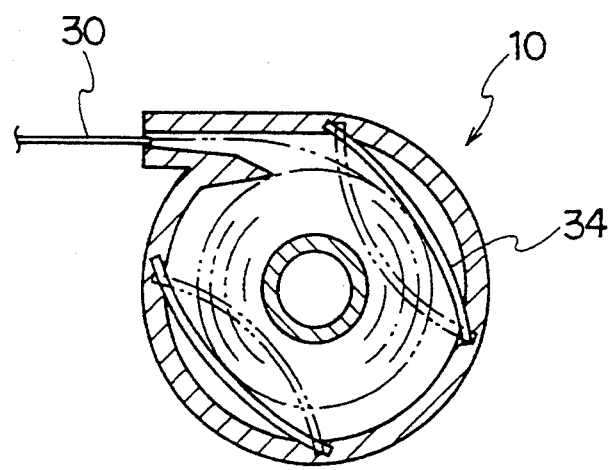
FIG. 5 is an explanatory section of a cartrige for showing the internal structure thereof.
Figure 6:
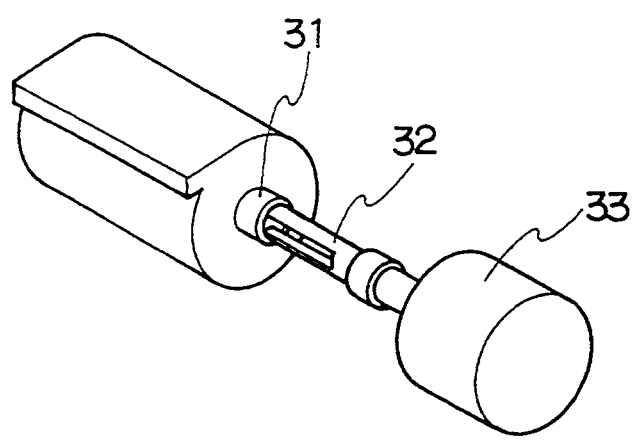
FIG. 6 is an explanatory view showing the relationship between a cartridge and a motor.
Figure 7:
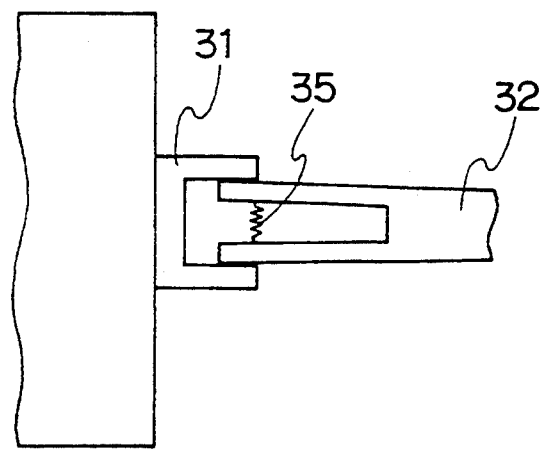
FIG. 7 is an explanatory view showing a spool connected to a coupling.

The film once printed is wound in the following manner as shown in FIGS. 5 to 7.

FIG. 5 is an explanatory section of a cartridge for showing the internal structure thereof. The film having been developed and printed is conveyed along a conveyer guide (not shown) and led into the cartridge 10 along a film guide 30 disposed adjacent an inlet of the cartridge 10.

When the leading end of the film enters the cartridge 10, a motor 33 connected to a spool 31 of the cartridge 10 through a coupling 32 is actuated to rotate the spool 31 for winding the film. In this case a plate spring 34 serves to urge the film againt the spool 31, so that the film is assuredly wound by the rotation of the spool 31. Note that in FIG. 5 the plate spring 34 in a condition where the film is absent in the cartridge 10 is drawn in chain double-dashed line. As can be seen from FIG. 5, the plate spring 34 is disposed so as to press the film against the spool 31. As shown in FIG. 7, the coupling 32 forks into two branches toward the cartridge 10, and 35 is provided between the a spring two branches to urge them in such a direction as to enlarge the space therebetween. This urging force of the spring 35 permits the coupling 32 to connect to the spool 31 and, hence, the rotating force of the motor 33 can be transmitted to the spool 31.

It should be understood that although the film photographed or the cartridge accommodating the film is previously provided with an ID number in the foregoing embodiment, alternatively the cartridge into which the film is wound might be provided with the same ID number as that given to the index print. Further, instead of winding the developed film into the cartridge, the film might be stored in a usual film sheet to which the same ID number as that given to the index print might be given. In these cases the cartridge can be provided with the ID number by attaching thereto a label on which the ID number is printed or directly printing the ID number thereon according to a non-impact printing method such as ink jet printing. Further, the index print can be provided with the ID number by attaching a label thereto similarly to the above, printing the ID number thereon, or directly printing the ID number thereon by exposure. Where a film sheet is provided with the ID number, the film sheet might be attached with a label having the ID number printed thereon or directly printed to indicate the ID number.

As has been described, according to the photographic processing method of the present invention a same ID number is provided on both a cartridge into which a developed film is wound or a film sheet storing the film and an index print corresponding to the film. Hence, one is able to specify in which film and in which frame of the film an image desired to be copy-printed is present.

While only certain presently preferred embodiments have been described in detail, as will be apparent with those familiar with the art, certain changes and modifications can be made without departing from the spirit and scope of the invention as defined by the following claims.

What is claimed is:

1. A photographic processing method for developing a film having been photographed, printing the developed film on a photographic paper and developing the photographic paper, the film being accommodated in a cartridge and set in a photographic processing apparatus, the method comprising the steps of:
   (a) providing in advance the film or the cartridge with an ID number for identifying the film;
   (b) automatically detecting the ID number identifying the film during processing using automatic sensors supplying output data to a central processing unit;
   (c) using a memory means provided with said central processing unit to store said ID number identifying the film;
   (d) making an index print in which respective images of a plurality of frames of the film are arranged in numeral order of the film; and
   (e) using said central processing unit to provide the index print with the ID number identifying the film.

2. The method of claim 1, wherein said developed film is wound into said cartridge provided with said ID number.

3. The method of claim 1, wherein said film is cut into pieces and then stored in a film sheet provided with said ID number.

4. A photographic processing method for developing a film having been photographed, printing the developed film on a photographic paper and developing the photographic paper, the film being accommodated in a cartridge and set in a photographic processing apparatus, the method comprising the steps of:
   (a) winding the developed film into the cartridge;
   (b) making an index print in which respective images of a plurality of frames of the film are arranged in numeral order of the film; and
   (c) using a central processing unit to provide the cartridge and index print with a same ID number identifying the film and the cartridge.

5. A photographic processing method for developing a film having been photographed, printing the developed film on a photographic paper and developing the photographic paper, the film being accommodated in a cartridge and set in a photographic processing apparatus, the method comprising the steps of:
   (a) cutting the developed film into some pieces and placing the pieces of the film into a film sheet;
   (b) making an index print in which respective images of a plurality of frames of the film are arranged in numeral order of the film; and
   (c) using a central processing unit to provide the index print with an ID number which is the same as a number identifying the film.

* * * * *